Patented Jan. 25, 1949

2,460,143

UNITED STATES PATENT OFFICE 2,460,143

PRODUCTION OF KETOAMINES

Maurice L. Moore and John R. Corrigan, Detroit, Mich., assignors to Sterling Drug Inc., New York, N. Y., a corporation of Delaware No Drawing. Application August 8, 1945, Serial No. 609,722

2 Claims. (Cl. 260—570.5)

1

This invention relates to an improvement in the manufacture of certain substituted omega-aminoacetophenones, said compounds having the general formula: $YO.C_6H_4.COCH_2NR_1R_2$; in which formula Y represents hydrogen, and acyl, or a monovalent hydrocarbon radical, such latter groups being convertible to hydroxy; $R_1$ represents a monovalent hydrocarbon radical; and $R_2$ represents hydrogen.

Methods for the preparation of hydroxy-omega-alkylaminoacetophenones have been practiced commercially for over fifteen years. For instance, Legerlotz in Patent 1,680,055 has shown that para-hydroxy-omega-alkylaminoacetophenones can be obtained by the reaction of alkylamines with para-hydroxy-omega-haloacetophenones.

In this prior method, involving the reaction of compounds of the type $YO.C_6H_4.COCH_2X$ with a substituted amine, the process is commercially carried out at a very low temperature, between —20 and +10 degrees centigrade, in order to decrease as much as possible the amount of tar and other undesirable products formed. However, the lower the temperature at which the reaction is carried out, the longer the reaction time required. Thus, while the rate of decomposition is decreased by the use of the lower temperatures, the total amount of tar and undesirable products formed is not materially reduced. And, when the time is decreased by elevating the temperature, the rate of formation of the undesirable products is increased to the point at which still lower yields of the desired product are obtained.

The procedure followed, for example, with respect to the specific compound, para-hydroxy-omega-methylaminoacetophenone, involves suspending para-benzoyloxy-omega-bromoacetophenone in isopropyl alcohol and then adding methylamine with constant stirring. The reaction mixture is thereafter stirred for a period of several hours with cooling to about 0 degree centigrade, or lower. Then the mixture is acidulated with concentrated hydrochloric acid, the temperature during the entire period not being allowed to rise above +5 degrees centigrade. When the reaction mixture becomes acid, the water and the alcohol are evaporated and the residual syrup is poured into acetone and stirred for several hours. The precipitate is filtered, washed, and the hydrochloride salt is recrystallized from ethyl alcohol.

Even when this lengthy process is carefully followed the yield of the desired acetophenone product is on the order only of about 30–35 per cent of theory.

2

Furthermore, when the process is applied to the production of meta-benzoyloxy-omega-bromoacetophenone instead of the para-compound, even lower yields, i. e. below about 25–30 per cent of theory, of the desired meta-hydroxy-omega-methylaminoacetophenone are obtained.

The poor results of said prior method apparently led Legerlotz to the development of a different method, disclosed in Patent 1,926,952. The process therein described involves reacting a hydrocarbonoxy-omega-haloacetophenone with, for example, the potassium salt of paratoluenesulfonmethylamide in acetone, separating the resulting potassium halide formed in the reaction mixture, and saponifying the product with fuming hydrochloric acid or hydriodic acid to produce the desired ketoamine. This procedure is equally applicable to production of the meta- as well as the para-ketoamines, but unfortunately the yield in either case is also very low. Moreover, the process is unduly complex and involves the use of a reactant; i. e. paratoluenesulfonalkylamide, which is in itself difficult of preparation and expensive.

These intermediates are valuable substances which can be hydrogenated to yield alpha-hydroxy-beta-alkylaminoalkyl-hydroxybenzenes, of which latter several millions of dollars worth are sold each year, and a more efficient process for their preparation has long been sought.

We have now found that the low yield of alpha-hydroxy-beta-alkylaminoalkyl-hydroxybenzenes obtained according to the foregoing processes arises more particularly out of the extremely low yield in the preparation of the intermediate ketoamines, as specifically described above, and, that any improvement in the yield of the said intermediate will carry through substantially quantitatively in the subsequent hydrogenation step, and will result in a corresponding increase in the yield of the final product.

We have discovered that the yield of hydroxy-omega-aminoacetophenones can be practically doubled and that the formation of tars and other undesirable products can be substantially avoided by reacting compounds having the formula: $YO.C_6H_4.COCH_2X$; in which Y is an alkyl, aralkyl or acyl group and X is a halogen; with monoalkylamines in such a manner that the free hydroxy-omega-aminoacetophenones are removed from the reaction mixture substantially as rapidly as they are formed and converted to a stable acid salt, as for instance, the hydrochloride salt. We have also discovered that the yield of hydroxy-omega-aminoacetophenones may be further increased by continuously mixing a suspension of compounds of the aforesaid type with the above-described amines at temperatures approaching but not materially exceeding 65 degrees centigrade, while removing the free ketoamines continuously from the reaction mixture. As an inert liquid suspending medium we employed isopropanol. However, we are not limited to the use of the above-mentioned compound and we can employ for this purpose any liquid in which the particular amine which we use is soluble, and which liquid is inert with the reactants used in the practice of our invention.

Although the relative proportions of the reactants in our process may be widely varied, we prefer to employ an excess of the amine to minimize the formation of any tertiary amines and to neutralize any acids which may be split off during the reaction. The reaction is exothermic and liberates much heat. Therefore, the reactants are mixed at such a rate as to maintain the temperature below about 65 degrees centigrade, and preferably between about 45 degrees and 65 degrees centigrade, or cooling may be resorted to, if a more rapid rate of production in a given reactor is desired. The solution containing the hydroxy-omega-aminoacetophenone, formed during the reaction, passes through the apparatus and is immediately neutralized with an acid, such as hydrochloric or tartaric, to form the stable acid salt. The reaction between the final amine solution and the acid is also exothermic and, accordingly, may be cooled for most efficient operation.

The following example illustrates the practice of our invention, but it is not to be construed as limiting the same:

Twelve liters of a suspension of 2880 grams of meta-benzoyloxy-omega-bromoacetophenone in isopropanol was placed into a mixing vessel and thoroughly agitated. Three liters of forty per cent aqueous methylamine solution was placed in another vessel. A reactor vessel was filled with a mixture of 100 milliliters of isopropanol and 100 milliliters of forty per cent aqueous methylamine solution. 3600 milliliters of concentrated hydrochloric acid was placed in a neutralizing vessel and the vessel was surrounded by cold running water. The stirrer in the reactor vessel and the neutralizing vessel were started to insure thorough agitation. The reactants were introduced simultaneously into the reactor at a uniform rate of about 50 milliliters per minute so that the reaction mixture passed through the reactor and into the neutralizer in five minutes where the hydroxy-omega-aminoacetophenone was converted into the hydrochloride salt by the hydrochloric acid. The total quantity of reactants was added in four hours and the temperature in the reactor varied between 45 degrees and 65 degrees centigrade. The temperature of the acid solution fluctuated between 10 and 35 degrees centigrade during the neutralization of the amine.

After all of the reactants had been passed through the reaction zone, the product in the neutralizer was concentrated by evaporation to a volume of about four liters, poured into acetone, and the hydrochloric salt of the ketoamine separated from the amine salt by crystallization from water. In this manner 859.0 grams of meta-hydroxy-omega-methylaminoacetophenone hydrochloride was recovered. The mother liquor was then further concentrated and 143.5 grams of additional meta-hydroxy-omega-methylaminoacetophenone hydrochloride were obtained, bringing the total yield of said product to 1002.5 grams. This represents a yield of 55 per cent of theory.

In the example illustrating the practice of our invention, we used meta-benzoyloxy-omega-bromoacetophenone as one of the reactants. We are not, however, limited to the use of the above-mentioned compound, and we can use in the practice of our invention any of the following compounds, for example: m-acetoxy-omega-chloroacetophenone; m-methoxy-omega-bromacetophenone; m-benzyloxy-omega-chloroacetophenone; p-benzyloxy-omega - bromoacetophenone; o-butoxy-omega-bromoacetophenone; 3,4-dibenzoyloxy - omega - bromoacetophenone; and 3,4-dimethoxy-omega-chloroacetophenone.

While we used methylamine as one of the reactants for purpose of illustration in the example shown, we are not limited to the use of this particular amine, since we are able to use in the practice of our invention, with equal facility, the following compounds: isopropylamine; cyclohexylamine.

We therefore claim:

1. The method for the preparation of meta-hydroxy - omega - methylaminoacetophenone which includes: continuously and separately introducing meta-benzoyloxy-omega-bromo-acetophenone and methylamine into a reaction zone containing a liquid inert to the reaction mixture and maintained at a temperature below about 65 degrees centigrade, removing the ketoamine from the said reaction zone in a portion of the reaction medium and neutralizing the ketoamine-containing product substantially as rapidly as it is formed.

2. The method of claim 1, wherein the neutralization is accomplished with hydrochloric acid.

MAURICE L. MOORE.
JOHN R. CORRIGAN.

REFERENCES CITED

The following references are of record in the file of this patent:

UNITED STATES PATENTS

| Number | Name | Date |
|---|---|---|
| 1,680,055 | Legerlotz | Aug. 7, 1928 |

FOREIGN PATENTS

| Number | Country | Date |
|---|---|---|
| 12,850/28 | Australia | Dec. 11, 1928 |
| 119,965 | Austria | June 15, 1930 |
| 123,851 | Austria | Mar. 15, 1931 |